United States Patent
Peera et al.

(10) Patent No.: US 9,115,288 B2
(45) Date of Patent: Aug. 25, 2015

(54) HASE-THICKENED COMPOSITION

(75) Inventors: Asghar Peera, Cary, IL (US); Anthony VanDyk, Blue Bell, PA (US); Anurima Singh, Midland, MI (US); Jung Kwon Oh, Midland, MI (US)

(73) Assignee: Rohm and Haas Company, Philadelphia, PA (US)

( * ) Notice: Subject to any disclaimer, the term of this patent is extended or adjusted under 35 U.S.C. 154(b) by 905 days.

(21) Appl. No.: 13/288,331

(22) Filed: Nov. 3, 2011

(65) Prior Publication Data

US 2012/0115999 A1 May 10, 2012

Related U.S. Application Data

(60) Provisional application No. 61/456,528, filed on Nov. 8, 2010, provisional application No. 61/490,119, filed on May 26, 2011.

(51) Int. Cl.
| | |
|---|---|
| *C08K 5/17* | (2006.01) |
| *C09D 7/00* | (2006.01) |
| *C08K 3/00* | (2006.01) |
| *C09D 7/12* | (2006.01) |

(52) U.S. Cl.
CPC ............ *C09D 7/002* (2013.01); *C08K 3/0083* (2013.01); *C08K 5/17* (2013.01); *C09D 7/1216* (2013.01); *C09D 7/1233* (2013.01)

(58) Field of Classification Search
CPC .... C09D 7/002; C09D 7/1216; C09D 7/1233; C08K 3/0083; C08K 5/053; C08K 5/17
USPC .................................................. 524/247, 249
See application file for complete search history.

(56) References Cited

U.S. PATENT DOCUMENTS

| | | |
|---|---|---|
| 3,894,980 A | 7/1975 | DeTommaso |
| 4,421,902 A | 12/1983 | Chang et al. |
| 5,192,592 A * | 3/1993 | Shay .............................. 427/358 |
| 5,292,828 A | 3/1994 | Jenkins et al. |
| 5,488,180 A | 1/1996 | Jenkins et al. |
| 2004/0022950 A1 | 2/2004 | Jung et al. |
| 2004/0062873 A1 | 4/2004 | Jung et al. |
| 2004/0211536 A1 * | 10/2004 | Baumeister ................... 162/135 |
| 2010/0041801 A1 * | 2/2010 | Dowling et al. .............. 524/186 |

FOREIGN PATENT DOCUMENTS

WO    WO2008081036 A1    7/2008

* cited by examiner

*Primary Examiner* — Ling Choi
*Assistant Examiner* — Wenwen Cai
(74) *Attorney, Agent, or Firm* — Reid S. Willis

(57) ABSTRACT

The present invention relates to a water-containing coating composition thickened with a hydrophobically modified alkali soluble emulsion, wherein the composition is neutralized by a combination of an alkali metal hydroxide or ammonium hydroxide and a low VOC alkanolamine.

10 Claims, No Drawings

HASE-THICKENED COMPOSITION

Hydrophobically modified alkali soluble (or swellable) emulsion (HASE) thickeners are low-cost rheology modifiers that offer all-liquid handling benefits in a manufacturing plant. However, coating compositions thickened with HASE thickeners frequently produce inferior scrub resistance compared to paints thickened with hydroxyethyl cellulose (HEC). This failing of HASE thickeners has prevented them from being as widely used as they might be.

The desirability of HASE thickeners is further diminished by the need for neutralizing agents, which come with their own set of problems: Neutralization with low cost alkali metal hydroxides give coating compositions with poor scrub resistance; neutralization with relatively low boiling point alkanolamines such as 2-amino-2-methylpropan-1-ol (AMP) results in compositions having unacceptably high levels of volatile organic compounds (VOCs); and the use of relatively low VOC alkanolamines such as butyldiethanol amine (BDEA), while solving the VOC problem, gives a product that is prohibitively expensive due to the large amounts of these low volatile alkanolamines required to neutralize the HASE. (Patent Publication WO2008/081036 discloses that BDEA was used in a molar excess of 60% (1.6×) with respect to the moles of units of methacrylic acid in the HASE.)

Alkanolamines are desirably included in coating formulations containing pigments to aid pigment dispersion and facilitate optimally lower dispersant levels; nevertheless, the art discloses uneconomically and, therefore, undesirably high amounts of alkanolamines for these purposes.

Currently, approaches to improve scrub resistance include using higher scrub performance binders, which tend to increase cost and cause an undesirable change in the balance of properties, and introducing reactive additives such as silane, which also increase cost.

While reformulation (change of binder, pigments, dispersant, coalescents, and/or surfactants) can generally produce a HASE thickened analog of an HEC thickened paint with acceptable scrub resistance (relative to the original HEC paint performance), the development of such an analog is costly and time-consuming; moreover, the need for complete reaccreditation presents a further obstacle.

It would therefore be an advance in the field of paint formulations to discover HASE-thickened paint formulations that can deliver scrub-resistance cost-effectively, e.g., with minimal change to the formulation.

SUMMARY OF THE INVENTION

The present invention addresses a need by providing water-containing coating composition comprising a) a binder; b) a neutralized hydrophobically modified alkali soluble emulsion having pendant COO⁻ groups; c) alkali metal or ammonium cations; and d) an alkanolamine or a salt thereof; wherein the alkanolamine is characterized by having: 1 to 2 nitrogen atoms; 2 to 4 hydroxyl groups; an equivalent molecular weight per nitrogen atom in the range of 90 to 180 Daltons; a boiling point of greater 250° C. at 760 Torr pressure; and a $pK_a$ in the range of 8.8 to 9.9; wherein the molar concentration of alkanolamine or salt thereof is 10 to 70 mole percent based on the molar concentration of COO⁻ groups in the composition; the mole ratio of alkanolamine to alkali metal or ammonium cations is in the range 0.10 to 0.70; and the pH of the coating formulation is in the range of 7 to 10.

The present invention addresses a need in the art by providing HASE-thickened paint formulations that can deliver scrub-resistance cost-effectively with minimal reformulation.

DETAILED DESCRIPTION OF THE INVENTION

The present invention is a water-containing coating composition comprising a) a binder; b) a neutralized hydrophobically modified alkali soluble emulsion having pendant COO⁻ groups; c) alkali metal or ammonium cations; and d) an alkanolamine or a salt thereof; wherein the alkanolamine is characterized by having: 1 to 2 nitrogen atoms; 2 to 4 hydroxyl groups; an equivalent molecular weight per nitrogen atom in the range of 90 to 180 Daltons; a boiling point of greater 250° C. at 760 Torr pressure; and a $pK_a$ in the range of 8.8 to 9.9; wherein the molar concentration of alkanolamine or salt thereof is 10 to 70 mole percent based on the molar concentration of COO⁻ groups in the composition; the mole ratio of alkanolamine to alkali metal or ammonium cations is in the range 0.10 to 0.70; and the pH of the coating formulation is in the range of 7 to 10.

Coating formulations include latex paint formulations, cosmetic formulations, dentifrices, hand lotions, automotive coatings formulations, architectural and industrial coatings formulations, caulks, adhesives, and sealants.

Examples of suitable binders include acrylic-, vinylacrylic-, styrene-acrylic, vinyl acetate/ethylene-, urethane-, melamine-, epoxy-, alkyd-, acrylonitrile-, styrene-, polybutadiene-, polyisoprene-, ethylene-propylene-, polyvinyl alcohol-, vinyl chloride-, vinylidene chloride-, epoxy-based homopolymers and copolymers, and blends of binders. The binder is typically present in the formulation at levels ranging from 2 to 50% by weight, based on the total weight of the coating formulation. Pigments include clays, calcium carbonate, mica, silicas, talcs, titanium dioxide, phthalo blue, and red and yellow iron oxide.

The coating formulation may also include colorants containing colored pigments that provide tint to coating compositions such as paints and semitransparent stains. One factor affecting the amount of colorant added to a coating composition to obtain a desired color is the light scattering efficiency and the light absorbing efficiency of the colored pigments. The scattering and absorbing efficiencies of colored pigments are affected by the extent of dispersion of the colored pigments in the coating composition. Colored pigment particles that are well dispersed and separated from each other are believed to provide increased color and optionally, increased hiding. The coating formulation can be formulated to a desired color with lower levels of the colored pigments than compositions in which the colored pigments are poorly dispersed. Alternatively, a coating formulation having well dispersed colored pigments typically display more intense colors, and permit the preparation of colored coatings with a broader color palette.

The coating composition according to the present invention may further include one or more of the following additives: Solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated opacifying pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

A coating formulation that provides a colored coating having a higher degree of opacity, a measure of substrate covering power, may be desired. A formulation suitable for providing colored coatings having a higher degree of color saturation, a measure of color intensity, may also be desired. Alternatively, a formulation that can be tinted to a desired color with lower level of colorants than conventional coating formulations may also be desired. A coating formulation having less variation in the efficiencies of a range of different colorant particles, to provide consistent colors when mixtures of colorant particles are employed, may also be desired.

The pigment particles contained in the formulation are white and nonwhite pigments. The colorant particles provide any color including white to the coating composition. Colorant particles include colored pigments, white pigments, black pigments, metal effect pigments, and luminescent pigments such as fluorescent pigments and phosphorescent pigments. The term "colorant particles", as used herein includes white pigment particles such as titanium dioxide, zinc oxide, lead oxide, zinc sulfide, lithophone, zirconium oxide, and antimony oxide. Examples of colors for the pigmented polymer composition include black, magenta, yellow, and cyan, as well as combinations of these colors such as orange, blue, red, pink, green, and brown. Other suitable colors for the pigmented polymer composition include fluorescent colors; metallic colors such as silver, gold, bronze, and copper; and pearlescent pigments. These colors are obtained by employing one or more different types of colorant particles.

The colorant particles include inorganic colorant particles and organic colorant particles. Typically, the colorant particles have average particle diameters in the range of from 10 nm to 50 µm, preferably in the range of from 40 nm to 2 µm.

Suitable inorganic colorant particles include, but are not limited to, titanium dioxide pigments, iron oxide pigments such as goethite, lepidocrocite, hematite, maghemite, and magnetite; chromium oxide pigments; cadmium pigments such as cadmium yellow, cadmium red, and cadmium cinnabar; bismuth pigments such as bismuth vanadate and bismuth vanadate molybdate; mixed metal oxide pigments such as cobalt titanate green; chromate and molybdate pigments such as chromium yellow, molybdate red, and molybdate orange; ultramarine pigments; cobalt oxide pigments; nickel antimony titanates; lead chrome; blue iron pigments; carbon black; and metal effect pigments such as aluminum, copper, copper oxide, bronze, stainless steel, nickel, zinc, and brass.

Suitable organic colorant particles include, but are not limited to, azo pigments, monoazo pigments, diazo pigments, azo pigment lakes, β-naphthol pigments, naphthol AS pigments, benzimidazolone pigments, diazo condensation pigment, metal complex pigments, isoindolinone, and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, and diketopyrrolo pyrrole pigments.

The hydrophobically modified alkali soluble emulsion (HASE) is an aqueous dispersion of a copolymer comprising an acylate ester or methacrylate ester (such as ethyl methacrylate and methyl methacrylate); methacrylic acid, acrylic acid, or itaconic acid; and an ethylenically unsaturated polyethylene oxide (polyEO) macromonomer modified with an alkyl or aralkyl hydrophobe, as illustrated by either of following structures:

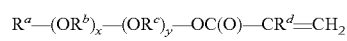

or

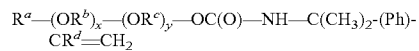

ethylenically unsaturated hydrophobically modified polyEO macromonomer where $R^a$ is the hydrophobic portion, preferably a $C_8$-$C_{24}$ alkyl or aralkyl group; x+y is 10 to 100, preferably 10 to 50; $R^b$ and $R^c$ are each independently $CH_2CH_2$, $CH_2CH(CH_3)$, or $CH_2CH_2CH_2CH_2$, preferably $R^b$ and $R^c$ are both $CH_2CH_2$; $R^d$ is H or $C_1$-$C_6$-alkyl, preferably methyl; and Ph is a phenylene group.

The HASE preferably contains from about 50 to 65 weight percent of units from ethyl acrylate, about 35 to 60 weight percent of units from methacrylic acid, and about 1 to 20 weight percent of units of the hydrophobically modified macromonomer. The preferred HASE composition may also include from about 0.01 to about 1 weight percent of units of a cross-linking agent, which is typically a diethylenically unsaturated compound such as divinyl benzene, allyl methacrylate, diallyl phthalate, trimethylol propane triacrylate, 1,6-hexanediol diacrylate, ethylene glycol diacrylate or dimethacrylate. The HASE has a weight average molecular weight $M_w$ ranging from 100,000 to several million Daltons. The concentration of HASE in the formulation is typically in the range of 0.1 to 1.0% based on total solids of the HASE and the total weight of the formulation.

The HASE may also contain from about 0.05 to about 5 percent by weight, based on the weight of total monomers, of a chain transfer agent to obtain molecular weights in the lower part of the range or even down to about 8000 Daltons. Examples of suitable chain transfer agents include hydroxyethyl mercaptan, β-mercaptopropionic acid, and $C_4$-$C_{22}$-alkylmercaptans.

The HASE is neutralized in the formulation with a combination of alkanolamine and alkali metal or ammonium hydroxide. The alkanolamine is characterized by having: 1 to 2 nitrogen atoms; 2 to 4 hydroxyl groups, preferably 2 to 3 hydroxyl groups; an equivalent molecular weight per nitrogen atom in the range of 90 to 180 Daltons; a boiling point of greater 250° C. at 760 Torr pressure; and a $pK_a$ in the range of 8.8 to 9.9. In another aspect, the equivalent molecular weight per nitrogen atom is in the range of 90 to 160 Daltons.

The concentration of alkanolamine in the formulation is preferably in the range of 15 to 50 mole percent based on the molar concentration of $COO^-$ groups in the formulation and the mole ratio of cations, preferably sodium, potassium, or lithium cations, or a combination thereof, to alkanolamine is from 1:1 to 7:1.

The concentration of alkali metal or ammonium cations is preferably at least 20 mole percent, based on the molar concentration of COO⁻ groups in the composition; more preferably from 20 to 90 mole percent, and most preferably from 50 to 90 mole percent.

Although a substantial portion of the COO⁻ groups in the formulation arise from the pendant COO⁻ groups of the HASE, the formulation may include additional COO⁻ groups, arising for example, from the dispersant, pigments, colorants, additives, surfactants, buffer salt, and the binder; thus, the term "molar concentration of COO⁻ groups in the composition" refers to the total concentration of COO⁻ groups in the formulation, not merely the contribution of pendant COO⁻ groups from the HASE.

Examples of specific alkanolamines include 2-amino-2-ethylpropane-1,3-diol (commercially available as VOX 1000 AEPD; $pK_a$: 8.8, BP: 273° C.); butyldiethanolamine (commercially available as Vantex T, $pK_a$: 8.9, BP: 279° C.); 2-(dimethylamino)-2-(hydroxymethyl)propane-1,3-diol (DMTA, $pK_a$: 9.1; BP: 305° C.); 2,2'-((2-hydroxypropane-1,3-diyl)bis(azanediyl))bis(2-methylpropan-1-ol) (AMP-dimer, $pK_a$: 9.4; BP: >300° C.); 2,6-diamino-2,6-dimethyl-5-phenylheptan-3-ol (CINNAM-AMP-NH₂, $pK_a$: 9.6; BP>300° C.); 2-((2-amino-2-methylpropyl)amino)-2-(hydroxymethyl)propane-1,3-diol (TA-AMP, $pK_a1$: 9.9; BP>280° C.); and 2-(((1-aminocyclohexyl)methyl)amino)-2-(hydroxymethyl)propane-1,3-diol (TA-AcyHM, $pK_a1$: 9.7; BP: >350 C). The structures of theses alkanolamines are illustrated:

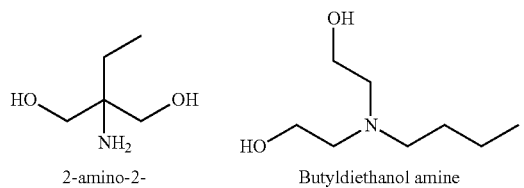

2-amino-2-ethylpropane-1,3-diol

Butyldiethanol amine

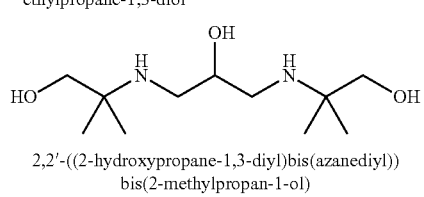

2,2'-((2-hydroxypropane-1,3-diyl)bis(azanediyl))bis(2-methylpropan-1-ol)

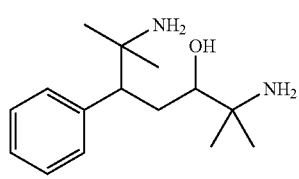

2,6-diamino-2,6-dimethyl-5-phenylheptan-3-ol

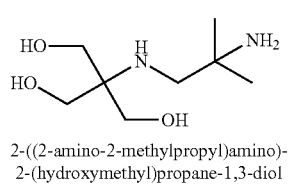

2-((2-amino-2-methylpropyl)amino)-2-(hydroxymethyl)propane-1,3-diol

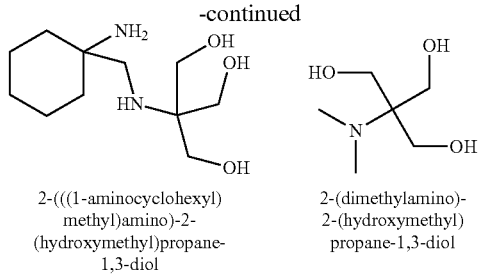

2-(((1-aminocyclohexyl)methyl)amino)-2-(hydroxymethyl)propane-1,3-diol 2-(dimethylamino)-2-(hydroxymethyl)propane-1,3-diol Scrub Test Methods:

Scrub resistance can be determined by ASTM D 2486-74A using a Byk-Gardener Abrasion Tester.

Scrub can also be measured using High Throughput Scrub as disclosed in US20090078035, page 5, paragraphs 0060 to 0069.

EXAMPLES

The following examples are for illustrative purposes only and are not intended to limit the scope of the invention. The numbers reported in all of the following tables are as a percentage of the weights of the batches. Scrub resistance was measured at least three times for each sample and the average scrub resistance is reported in the tables.

Example 1 and Comparative Examples 1 and 2

Paints were made as 8.5 g batches for high throughput combinatorial testing. Scrub testing was performed as described in US20090078035, page 5, paragraphs 0060 to 0069 using a drawdown bar, such as a Leneta AD-710 Dow Film Caster Applicator, having a gap of 7 mils. Conditions for the flat paint 62% PVC were 4 min scrubbing with 150 g loads. The results are reported as scrub DT (Delta Thickness) in mils.

Table 1 illustrates the effect of alkanolamine and sodium hydroxide concentrations on Scrub resistance. The paint was thickened with ACRYSOL DR-110 (HASE thickener) and neutralized with either NaOH (Comp 1), alkanolamine (Comp 2), or a combination thereof (Example 1). DMTA was used as the alkanolamine for Example 1, and AEPD was used for Comp 2. Comp 1 shows a large delta thickness (Scrub DT) indicating poor resistance and a large removal of film during scrubbing. Example 1 and Comp 2 show scrub resistance similar to each other and improved scrub resistance with respect to Comp 2 (less removal of film during scrubbing).

Example 1 achieves acceptable scrub resistance with a substantially reduced amount of alkanolamine (0.17 vs. 0.42 total dry base percent), resulting in a significant cost savings. Furthermore, in general, it is desirable to reduce the amount of additives such as neutralizing base in a formulation to minimize side-effects such as softening and water-sensitivity.

TABLE 1

Scrub Resistance Comparisons for Neutralizing Base Additives

| Material Name | Type | Ex 1 | Comp 1 | Comp 2 |
|---|---|---|---|---|
| Grind | Stage | | | |
| Water | Water | 6.33 | 6.33 | 6.33 |
| Natrosol 250 MHR | Thickener | 0.04 | 0.04 | 0.04 |
| Propylene Glycol | Solvent | 0.19 | 0.19 | 0.19 |
| Sodium Hydroxide (10%) | Base | 0.60 | 0.60 | 0.60 |
| Tamol 2002 | Dispersant | 1.26 | 1.26 | 1.26 |

TABLE 1-continued

Scrub Resistance Comparisons for Neutralizing Base Additives

| Material Name | Type | Ex 1 | Comp 1 | Comp 2 |
|---|---|---|---|---|
| Kathon LX 1.5% | Biocide | 0.15 | 0.15 | 0.15 |
| BYK-022 | Defoamer | 0.10 | 0.10 | 0.10 |
| Ti-Pure R-706 | Titanium Dioxide | 13.46 | 13.46 | 13.46 |
| Optiwhite | Extender | 7.57 | 7.57 | 7.57 |
| Omyacarb 12 | Extender | 21.03 | 21.03 | 21.03 |
| Foamstar A12 | Defoamer | 0.08 | 0.08 | 0.08 |
| Celite 281 | Extender | 1.01 | 1.01 | 1.01 |
| Water | Water | 1.75 | 1.75 | 1.75 |
| Ropaque Ultra | Opaque Polymer | 2.92 | 2.92 | 2.92 |
| Grind Sub-total | | 56.49 | 56.49 | 56.49 |
| LetDown | Stage | | | |
| Water | Water | 2.31 | 2.31 | 2.31 |
| Ucar 379G | Binder | 19.60 | 19.60 | 19.60 |
| DMTA 10% | Base | 0.68 | | |
| AEPD 10% | Base | | | 3.62 |
| Sodium Hydroxide (10%) | Base | 0.43 | 0.61 | |
| Texanol | Coalescent | 1.01 | 1.01 | 1.01 |
| ACRYSOL DR-110 | Thickener | 1.10 | 1.10 | 1.10 |
| Water | Water | 18.38 | 18.88 | 19.49 |
| Total: | | 100.00 | 100.00 | 100.00 |
| pH | | 8.6 | 8.5 | 8.7 |
| Scrub DT | | 1.1 | 1.4 | 1.0 |
| total dry base wt. pph | | 0.17 | 0.12 | 0.42 |
| alkanolamine % on total dry base | | 0.40 | 0 | 0.86 |
| ratio alkanolamine/HASE MAA | | 0.30 | 0 | 1.99 |
| ratio alkanolamine/NaOH | | 0.18 | 0 | 2.00 |
| mole fraction NaOH on total base | | 0.85 | 1.00 | 0.33 |
| mole fraction alkanolamine on total base | | 0.15 | 0 | 0.67 |

Example 2 and Comparative Examples 3 and 4

For Example 2 and Comparative Examples 3 and 4 (CE 3, CE 4) paints were made as 238 g batches. Pigment dispersions were made on a Hauschild SpeedMixer DAC 150FVZ and master-batches on a Cowles Morehouse W-12-1.5 made by Morehouse Industries, Fullerton, Calif. Paint letdowns were mixed with a Janke&Kunkel IKA-WERKE RW 20 DZM mixer. Measurements of pH were made with a Fisher Scientific accumet AB15 digital pH meter calibrated with pH 7.00 and 10.00 buffer solutions. Paints were equilibrated to 25° C. with a Thermo HAAKE waterbath model DC10 and the KU viscosity measured with a BYK Gardener KU-1+ viscometer.

Table 2 illustrates that the scrub resistance of a HASE-thickened formulation of the present invention (Example 2, using NaOH and butyl diethanolamine (Vantex T)) is at least as good as the scrub-resistance of a HEC-thickened formulation (Comparative Example 3). Typically, HASE-thickened formulations have less scrub resistance than HEC-thickened formulations.

Moreover, the formulation of the present invention shows a scrub resistance that is at least as good as (and possibly better than) the formulation neutralized with alkanolamine only.

TABLE 2

Scrub-Resistance Comparisons of HASE- and HEC-thickened Formulations

| Material Name | Type | Ex 2 | CE 3 | CE 4 |
|---|---|---|---|---|
| Water | Water | 6.41 | 7.37 | 7.37 |
| Natrosol 250 MHR | Thickener | 0.04 | 0.04 | 0.04 |
| Propylene Glycol | Solvent | 0.19 | 0.19 | 0.19 |
| Sodium Hydroxide (10%) | Base | 0.39 | 0.08 | 0.08 |
| Vantex T 10% | Base | 0.39 | | |
| AMP-95 | Base | | 0.04 | 0.04 |
| Tamol 1254 | Dispersant | | 0.65 | 0.65 |
| Tamol 2002 | Dispersant | 1.26 | 0.00 | |
| Kathon LX | Biocide | 0.15 | 0.15 | 0.15 |
| BYK-022 | Defoamer | 0.10 | 0.09 | 0.09 |
| Ti-Pure R-706 | Titanium Dioxide | 13.47 | 12.97 | 12.98 |
| Optiwhite | Extender | 7.58 | 7.30 | 7.30 |
| Omyacarb 12 | Extender | 21.04 | 20.27 | 20.27 |
| Celite 281 | Extender | 1.01 | 0.97 | 0.97 |
| water | Water | | 1.97 | 1.97 |
| Ropaque Ultra | Opaque Polymer | 2.92 | 2.81 | 2.81 |
| grind subtotal | | 54.95 | 54.90 | 54.92 |
| Foamstar A12 | | 0.08 | 0.08 | 0.08 |
| Natrosol 250 MHR | Thickener | | 0.57 | |
| Water | Water | | 22.10 | |
| Rovace 9900 | Binder | 19.47 | 19.45 | 19.45 |
| Texanol | Coalescent | 0.59 | 0.59 | 0.59 |
| Vantex T 10% | Base | 0.90 | | |
| Sodium Hydroxide (10%) | Base | 0.90 | | |
| AMP95 | Base | | 0.01 | 0.15 |
| DR-110 | Thickener | 1.70 | | 1.64 |
| Water | Water | 21.41 | 2.30 | 23.17 |
| Total | | 100.00 | 100.00 | 100.00 |
| pH | | 8.9 | 9.0 | 9.0 |
| KU | | 95.8 | 101.9 | 96.8 |
| Scrub* | | 612 | 599 | 547 |
| total dry base wt. pph | | 0.26 | 0.06 | 0.20 |
| alkanolamine % on total dry base | | 0.50 | 0.86 | 0.96 |
| ratio alkanolamine/HASE MAA | | 0.34 | NA | 0.94 |
| ratio alkanolamine/NaOH | | 0.25 | 2.84 | 10.63 |
| mole fraction NaOH on total base | | 0.80 | 0.26 | 0.09 |
| mole fraction alkanolamine on total base | | 0.20 | 0.74 | 0.91 |

*ASTM D 2486-74A 7 mils with shim.

For Example 3 and Comparative Examples 5 and 6, paints were made as 213 g batches. Table 3 illustrates the effect of binder and formulation on scrub resistance using the same neutralizing agents in similar amounts as for the examples in Table 2. Although the scrub resistance is better in each case, the trend is the same: A HASE-thickened paint that contains a combination of NaOH and alkanolamine shows comparable scrub-resistance to a HEC-thickened formulation (Comparative Example 5) and an equivalent scrub-resistance to the all-alkanolamine neutralized formulation (Comparative Example 6).

Both comparative examples used the same neutralizing agent, AMP-95, while Example 3 used DMTA.

TABLE 3

Scrub-Resistance Comparisons of HASE- and HEC-thickened Formulations

| Material Name | Type | Ex 3 | CE 5 | CE 6 |
|---|---|---|---|---|
| Water | Water | 1.77 | 1.85 | 1.77 |
| Tergitol 15-S-9 | Surfactant | 0.28 | 0.28 | 0.28 |

TABLE 3-continued

Scrub-Resistance Comparisons of HASE- and HEC-thickened Formulations

| Material Name | Type | Ex 3 | CE 5 | CE 6 |
|---|---|---|---|---|
| DMTA 10% | Base | 0.19 | | |
| Sodium Hydroxide (10%) | Base | 0.19 | 0.04 | 0.23 |
| AMP-95 | Base | | 0.04 | 0.19 |
| Tamol 1254 | | | 0.18 | |
| Tamol 2002 | Dispersant | 0.46 | | 0.46 |
| Kathon LX | Biocide | 0.09 | 0.09 | 0.09 |
| Drewplus L-475 | Defoamer | 0.23 | 0.23 | 0.23 |
| Ti-Pure R-746 | Titanium Dioxide | 9.25 | 9.23 | 9.25 |
| Laponite RDS | Thickener | 0.19 | 0.19 | 0.19 |
| Snowflake | Extender | 3.24 | 3.23 | 3.24 |
| Atomite | Extender | 1.85 | 1.85 | 1.85 |
| Optiwhite | Extender | 1.57 | 1.57 | 1.57 |
| Omyacarb UF | Extender | 1.48 | 1.48 | 1.48 |
| Water | Water | 1.50 | 1.85 | 1.50 |
| Ti-Pure R-746 | Titanium Dioxide | 15.72 | 15.69 | 15.73 |
| Ropaque Ultra | Opaque Polymer | 4.62 | 4.61 | 4.63 |
| Grind Sub-total | | 42.65 | 42.40 | 42.69 |
| Natrosol 250 MHR | Thickener | | 0.69 | |
| Water | Water | | 11.56 | |
| Primal SF-016 ER | Binder | 40.22 | 40.13 | 40.23 |
| Optifilm | Coalescent | 0.09 | 0.09 | 0.09 |
| DMTA 10% | Base | 1.30 | | |
| Sodium Hydroxide (10%) | | 1.30 | | |
| AMP95 | Base | | 0.05 | 0.17 |
| DR-110 | Thickener | 1.76 | | 1.82 |
| Water | Water | 12.67 | 5.08 | 14.99 |
| Total | | 100.00 | 100.00 | 100.00 |
| pH | | 9.05 | 8.99 | 9.00 |
| KU | | 99.3 | 115.4 | 96.9 |
| Scrub* | | 1161 | 1073 | 1184 |
| total dry base wt. pph | | 0.30 | 0.089 | 0.38 |
| alkanolamine % on total dry base | | 0.50 | 0.95 | 0.94 |
| ratio alkanolamine/ HASE MAA | | 0.41 | NA | 1.60 |
| ratio alkanolamine/ NaOH | | 0.27 | 9.17 | 7.00 |
| mole fraction NaOH on total base | | 0.79 | 0.10 | 0.12 |
| mole fraction alkanolamine on total base | | 0.21 | 0.90 | 0.88 |

*ASTM D 2486-74A 7 mils with shim.

Example 4 and Comparative Examples 7 and 8

Paints were made as 8.5 g batches for high throughput combinatorial testing. Scrub testing was performed as described in Example 1.

Table 4 illustrates the effect of alkanolamine and sodium hydroxide concentrations on Scrub resistance when binder and thickener are varied. The paint was thickened with either ACRYSOL™ TT-935 (HASE thickener) or HEC Natrosol 250 MHR and neutralized with either NaOH (Comp 7 and 8), or a combination of AEPD and NaOH (Example 4). Comp 7 shows a large delta thickness (Scrub DT) indicating poor resistance and a large removal of film during scrubbing. Example 4 and Comp 8 show scrub resistance similar to each other and improved scrub resistance with respect to Comp 7 (less removal of film during scrubbing).

Example 4 achieves acceptable scrub resistance with an acceptable amount of alkanolamine (0.08 parts per hundred pph vs. 0.11 pph NaOH in Comp 7), resulting in a HASE-thickened paint with significant cost savings when compared to the HEC-thickened Comp 8.

Surprisingly, it has been demonstrated that substantially lower concentrations of a low $pK_a$, low VOC alkanolamine—in combination with a strong base such as sodium hydroxide—can be used to improve scrub resistance of finished coatings cost-effectively and with minimal change to the formulation.

TABLE 4

Scrub Resistance Comparisons of ACRYSOL ™ TT-935 HASE and HEC-thickened formulations

| Material Name | Type | Ex 4 | Comp 7 | Comp 8 |
|---|---|---|---|---|
| Grind | Stage | | | |
| Water | Water | 6.33 | 6.34 | 6.37 |
| Natrosol 250 MHR | Thickener | 0.04 | 0.04 | 0.04 |
| Propylene Glycol | Solvent | 0.19 | 0.19 | 0.20 |
| Sodium Hydroxide (10%) | Base | 0.60 | 0.60 | 0.60 |
| Tamol 2002 | Dispersant | 1.26 | 1.26 | 1.27 |
| Kathon LX 1.5% | Biocide | 0.15 | 0.15 | 0.15 |
| BYK-022 | Defoamer | 0.10 | 0.10 | 0.10 |
| Ti-Pure R-706 | Titanium Dioxide | 13.46 | 13.48 | 13.53 |
| Optiwhite | Extender | 7.57 | 7.58 | 7.61 |
| Omyacarb 12 | Extender | 21.03 | 21.06 | 21.14 |
| Foamstar A12 | Defoamer | 0.08 | 0.08 | 0.08 |
| Celite 281 | Extender | 1.01 | 1.01 | 1.01 |
| Water | Water | 1.75 | 1.75 | 1.76 |
| Ropaque Ultra | Opaque Polymer | 2.92 | 2.92 | 2.93 |
| Grind Sub-total | | 56.49 | 56.58 | 56.79 |
| LetDown | Stage | | | |
| Water | Water | 2.93 | 2.32 | 2.33 |
| Avanse 415 | Binder | 21.01 | 19.63 | 19.70 |
| AEPD 10% | Base | 0.84 | | |
| Sodium Hydroxide (10%) | Base | 0.17 | 0.45 | 0.01 |
| Texanol | Coalescent | 0.59 | 1.01 | 1.01 |
| Natrosol 250 MHR | Thickener | | | 0.57 |
| Acrysol TT-935 | Thickener | 1.10 | 1.10 | 0.00 |
| Water | Water | 16.87 | 18.91 | 19.59 |
| Total | | 100.00 | 100.00 | 100.00 |
| Scrub DT | | 0.72 | 0.93 | 0.83 |
| pH | | 8.6 | 8.6 | 8.8 |
| total dry base wt. pph | | 0.16 | 0.11 | 0.06 |
| alkanolamine wt. pph | | 0.08 | 0 | 0 |
| alkanolamine % on total dry base | | 0.52 | 0 | 0 |
| ratio alkanolamine/ HASE MAA | | 0.46 | 0 | NA |
| ratio alkanolamine/ NaOH | | 0.37 | 0 | 0 |
| mole fraction NaOH on total base | | 0.73 | 1 | 1 |
| mole fraction alkanolamine on total base | | 0.27 | 0 | 0 |

What is claimed is:

1. A water-containing coating composition comprising a) a binder; b) a neutralized hydrophobically modified alkali soluble emulsion having pendant $COO^-$ groups; c) alkali metal cations; and d) an alkanolamine or a salt thereof; wherein the alkanolamine is characterized by having: 1 to 2 nitrogen atoms; 2 to 4 hydroxyl groups; an equivalent molecular weight per nitrogen atom in the range of 90 to 180 Daltons; a boiling point of greater 250° C. at 760 Torr pressure; and a $pK_a$ in the range of 8.8 to 9.9; wherein the molar concentration of alkanolamine or salt thereof is 10 to 70 mole percent based on the molar concentration of $COO^-$ groups in the composition; the mole ratio of alkanolamine to alkali metal cations is in the range 0.10 to 0.70; and the pH of the coating formulation is in the range of 7 to 10.

2. The composition of claim 1 which further includes a pigment.

3. The composition of claim 2 wherein the alkanolamine is 2-amino-2-ethylpropane-1,3-diol; butyldiethanolamine; 2-(dimethylamino)-2-(hydroxymethyl)propane-1,3-diol;2, 2'-((2-hydroxypropane-1,3-diyl)bis(azanediyl))bis(2-methylpropan-1-ol);2-((2-amino-2-methylpropyl)amino)-2-(hydroxymethyl)propane-1,3-diol; or 2-(((1-aminocyclohexyl)methyl)amino)-2-(hydroxymethyl)propane-1,3-diol; or a combination thereof.

4. The composition of claim 3 wherein the concentration of alkanolamine is from 15 to 50 mole percent based on the molar concentration of $COO^-$ groups in the composition; and the molar concentration of alkali metal cations is from 50 to 90 mole percent based on the molar concentration of $COO^-$ groups in the composition.

5. The composition of claim 4 wherein the alkanolamine is 2-(dimethylamino)-2-(hydroxymethyl)propane-1,3-diol.

6. The composition of claim 4 wherein the alkanolamine is butyldiethanolamine.

7. The composition of claim 4 wherein the alkanolamine is 2-amino-2-ethylpropane -1,3-diol.

8. The composition of claim 1 wherein the pH is in the range of 7.5 to 9.5.

9. The composition of claim 1 wherein the molecular weight of the alkanolamine is 90 to 160 Daltons.

10. The composition of claim 1 which further comprises polymer-encapsulated or partially encapsulated opacifying pigment particles.

\* \* \* \* \*